(12) United States Patent
Tseng

(10) Patent No.: US 7,066,544 B2
(45) Date of Patent: Jun. 27, 2006

(54) HEADREST MOUNTING STRUCTURE

(75) Inventor: Hung-Chang Tseng, Taipei (TW)

(73) Assignee: Baton Digital Electronic Tech. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/163,130

(22) Filed: Oct. 6, 2005

(65) Prior Publication Data
US 2006/0061185 A1 Mar. 23, 2006

Related U.S. Application Data

(63) Continuation of application No. 10/711,515, filed on Sep. 23, 2004, now abandoned.

(51) Int. Cl.
A47C 7/36 (2006.01)
A47C 7/72 (2006.01)
A47C 31/00 (2006.01)
B60N 2/48 (2006.01)
B60R 21/55 (2006.01)

(52) U.S. Cl. ............... 297/391; 297/216.12; 297/217.3
(58) Field of Classification Search ............... 297/391, 297/408, 216.12, 217.3
See application file for complete search history.

(56) References Cited

U.S. PATENT DOCUMENTS

| 3,063,749 | A | * | 11/1962 | Struble et al. ........... 297/391 X |
| 3,205,005 | A | * | 9/1965 | Brown ............... 297/216.12 X |
| 3,403,938 | A | * | 10/1968 | Cramer et al. ............... 297/391 |
| 3,508,788 | A | * | 4/1970 | Barton, Jr. et al. .......... 297/391 |
| 3,528,703 | A | * | 9/1970 | Ohta ............................ 297/391 |
| 4,489,979 | A | * | 12/1984 | Zyngier ....................... 297/391 |
| 4,527,834 | A | * | 7/1985 | Zyngier ................... 297/391 X |
| 4,744,601 | A | * | 5/1988 | Nakanishi ................... 297/391 |
| 5,713,633 | A | * | 2/1998 | Lu ....................... 297/217.3 X |
| 6,012,753 | A | * | 1/2000 | Ordoyne et al. ........ 297/391 X |
| 6,250,967 | B1 | * | 6/2001 | Chu .................... 297/217.3 X |
| 6,406,334 | B1 | * | 6/2002 | Chu .................... 297/217.3 X |
| 6,585,318 | B1 | * | 7/2003 | Tak .................... 297/216.12 X |
| 6,669,285 | B1 | * | 12/2003 | Park et al. ............... 297/217.3 |
| 6,698,832 | B1 | * | 3/2004 | Boudinot ................ 297/391 X |
| 6,739,654 | B1 | * | 5/2004 | Shen et al. .......... 297/217.3 X |
| 6,786,547 | B1 | * | 9/2004 | Chu .................... 297/217.3 X |
| 6,883,870 | B1 | * | 4/2005 | Jost ............................. 297/391 |
| 6,905,167 | B1 | * | 6/2005 | Jost ..................... 297/217.3 X |
| 2002/0060482 | A1 | * | 5/2002 | Sakakibara et al. ..... 297/216.12 |
| 2004/0004378 | A1 | * | 1/2004 | Park et al. ............... 297/217.3 |
| 2004/0007906 | A1 | * | 1/2004 | Park et al. ............... 297/217.3 |
| 2004/0160096 | A1 | * | 8/2004 | Boudinot ................. 297/217.3 |
| 2005/0099042 | A1 | * | 5/2005 | Vitito ....................... 297/217.3 |
| 2005/0110313 | A1 | * | 5/2005 | Vitito et al. .............. 297/217.3 |
| 2005/0242636 | A1 | * | 11/2005 | Vitito ....................... 297/217.3 |
| 2005/0242637 | A1 | * | 11/2005 | Vitito ....................... 297/217.3 |
| 2005/0242638 | A1 | * | 11/2005 | Vitito ....................... 297/217.3 |

FOREIGN PATENT DOCUMENTS

| DE | 4307444 A1 | * | 9/1994 | ................. 297/391 |
| JP | 04303402 A | * | 10/1992 | ................. 297/391 |

* cited by examiner

Primary Examiner—Rodney B. White

(57) ABSTRACT

A headrest mounting structure includes a headrest, a support frame, which supports the headrest in shape and has a bottom coupling groove and mounting through holes in the bottom coupling groove, and two mounting bars which have a respective top coupling block slidably coupled to the bottom coupling groove of the support frame and selectively fastened to the mounting through holes of the support frame with screws at the desired location subject to the pitch between headrest mounting holes of a vehicle seat to which the headrest to be attached.

8 Claims, 7 Drawing Sheets

HEADREST MOUNTING STRUCTURE

This application is a Continuation of Application of my patent application Ser. No. 10/711,515, filed on Sep. 23, 2004, now abandoned.

BACKGROUND OF THE INVENTION

1. Field of the Invention

The present invention relates to a headrest for motor vehicle and more particularly, to a headrest mounting structure, which is adjustable to fit the pitch between the two headrest mounting holes of any of a variety of vehicle seats.

2. Description of the Related Art

Following the prosperity of the society, people do care about the outer appearance design as well as the comfortable status of the internal upholstery when buying a car. Nowadays, a car is not simply a transportable vehicle. A modern car may be equipped with stereo system, hand-free handset, VCD player, multimedia system, etc. In order to fully utilize the limited internal space of a car, the headrest of the driver' seat or front seat may be used to support a LCD monitor. However, an old model car does not provide a LCD monitor. When wishing to install a LCD monitor in a seat in an old model car, the headrest of the seat must be taken away so that a new headrest that is equipped with a LCD monitor can be used as a substitute. However, different vehicle seats may use different sizes of headrests. In order to fit different vehicle seats, suppliers and distributors must provide different sizes of headrests for selection. Preparing different sizes of headrests is a big burden to inventory control.

FIG. 4 shows a headrest B installed in a vehicle seat A according to the prior art. According to this design, the headrest B comprises a support frame C1 fixedly mounted inside the headrest B, and two mounting rods C2 downwardly extending from the support frame C1 and arranged in parallel for inserting into a respective headrest mounting hole A1 at the top side of the vehicle seat A. According to this design, the mounting rods C2 are not detachable. Because the mounting rods C2 protrude over the bottom side of the headrest B at a distance, the headrest B occupies much storage space. During delivery, the headrest B requires much packing material. Further, because the pitch between the two mounting rods C2 is not adjustable, this design of headrest B fits only one particular model of vehicle seat A.

In order to eliminate the drawbacks of the aforesaid headrest design, an adjustable headrest that fits different vehicle seats is disclosed. According to this design, as shown in FIG. 5, the headrest B comprises a base frame D, a clamping plate D1 provided at the front side of the base frame D, a locating bar D2 horizontally set between the base frame D and the clamping plate D1, two mounting blocks D3 slidably mounted on the locating bar D2, two tightening up screws D31 respectively fastened to the mounting blocks D3 to lock the mounting blocks D3 to the locating bar D2 at the desired location, and two stems D4 respectively fastened to the mounting blocks D3 through a respective screw joint for fastening the headrest B to a vehicle seat. This design of headrest B is adjustable to fit vehicle seats. However, when adjusting the pitch between the two stems D4 (the mounting blocks D3), the user must detach the parts of the headrest B (because the adjusting structure is kept inside the headrest B). This adjustment procedure is complicated. When detaching the parts of the headrest B, the leather covering or stuffing sponge may be damaged accidentally. Further, the tightening up screws D31 may be loosened upon vibration of the car. When the tightening up screws D31 are loosened, the headrest B may vibrate or displace, and the user must open the headrest B and fasten tight the tightening up screws D31 again.

FIGS. 6 and 7 show still another structure of the headrest mounting structure according to the prior art. According to this design, the headrest B comprises a base frame E mounted inside the headrest B, the base frame E having an upwardly extending support frame E1, a chamber E2 and bottom through holes E21 in communication with the chamber E2, an axle F mounted in the chamber E2 of the base frame E and having a screw hole F1 in each end, two support rods G respectively inserted through the bottom through holes E21 of the base frame E, the support rods G each having an angled screw tip G1 respectively threaded into the screw holes F1 at the ends of the axle F, and a U-shaped locating plate H fastened to the axle F and the base frame E to secure the axle F to the base frame E firmly in position. Because the support rods G are respectively fastened to the axle F through a respective screw joint, the support rods G can be adjusted relative to the axle F to further adjust the pitch between the support rods G. When assembled, the support rods G are fastened to respective headrest mounting holes A1 of the vehicle seat A. This design of headrest is functional; however it needs to open the headrest B when wishing to adjust the pitch between the support rods G. Further, because the support rods G are respectively fastened to the axle F through a respective screw joint, the user can only adjust the pitch between the support rods G within a short distance.

Further, the complicated procedure of adjusting the pitch between the support rods G of the headrest B shown in FIGS. 6 and 7 or the pitch between the two the two stems D4 (the mounting blocks D3) of the headrest B shown in FIG. 5 can only be done by a skilled professional person. The car owner shall have to pay an extra installation fee to the supplier.

SUMMARY OF THE INVENTION

The present invention has been accomplished under the circumstances in view. It is the main object of the present invention to provide to a headrest mounting structure, which is adjustable to fit the pitch between the two headrest mounting holes of any of a variety of vehicle seats. To achieve this and other objects of the present invention, the headrest mounting structure comprises a headrest, which comprises a flexible cover shell having a bottom opening, and a stuffing material stuffed in the flexible cover shell; a support frame, which is mounted in the headrest to support the headrest in shape, comprising an elongated horizontal mounting block suspending in the bottom opening of the flexible cover shell of the headrest, the elongated horizontal mounting block having a bottom coupling groove formed in the bottom wall thereof and a plurality of mounting through holes formed in the bottom coupling groove and extending through the top side of the elongated horizontal mounting block; and a plurality of mounting bars for securing the support frame to a vehicle seat, the mounting bars each comprising a top coupling block coupled to the bottom coupling groove of the elongated horizontal mounting block of the support frame, the top coupling block having an oblong through hole cut through top and bottom sides thereof, and a stem perpendicularly downwardly extending from one side of the top coupling block for inserting into a respective headrest mounting hole on the vehicle seat; and fastening members adapted to selectively fasten the oblong through hole of the top coupling block of each of the mounting bars to the mounting through holes of the support frame. Further, the stems of the mounting bars can be made detachable so that different diameters of stems can be selectively sued to fit different diameters of the headrest mounting holes of different vehicle seats.

DETAILED DESCRIPTION OF THE PREFERRED EMBODIMENT

Figure 1:
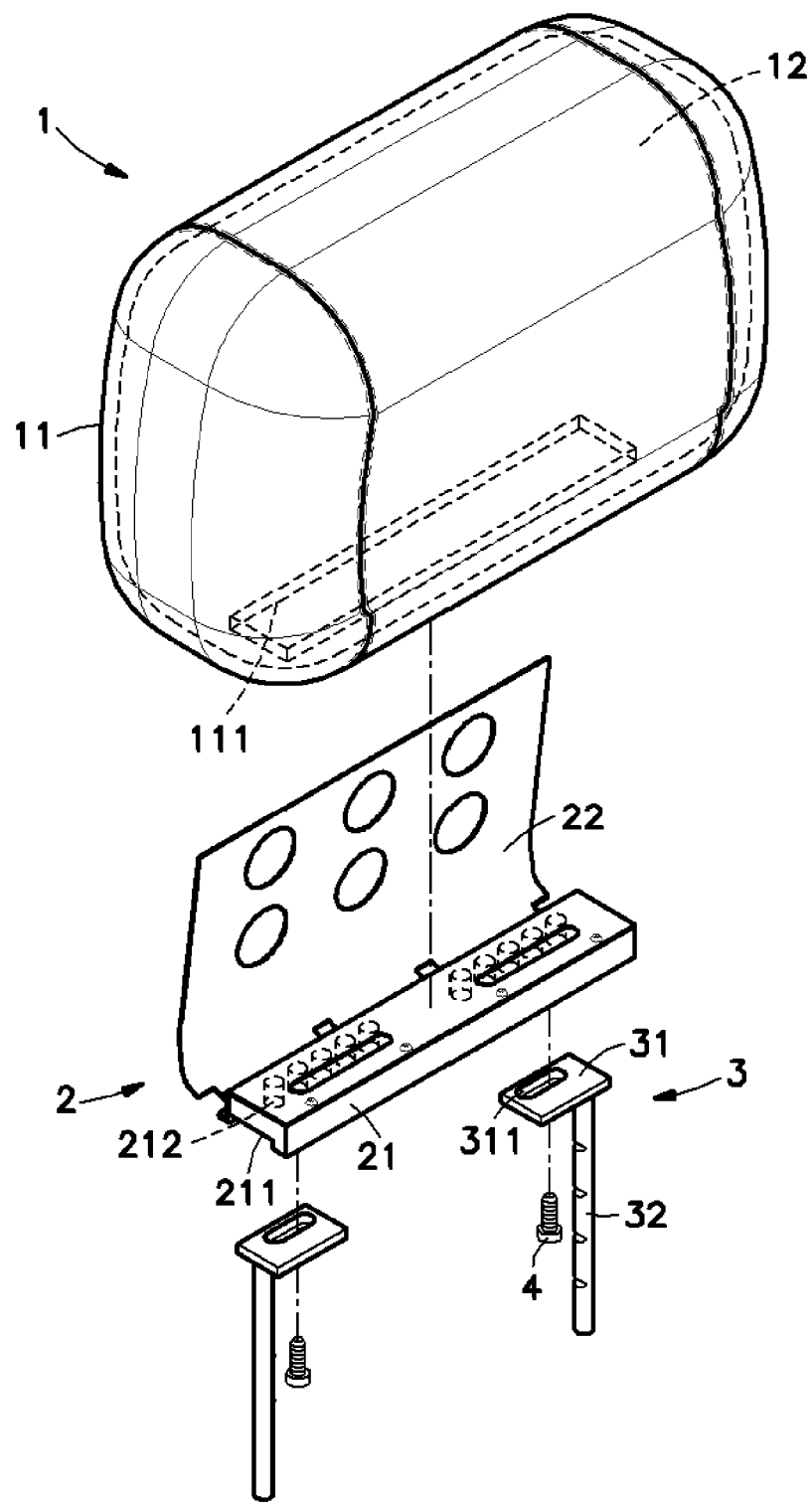
FIG. 1 is an exploded view of a headrest mounting structure according to the present invention.

Referring to FIG. 1, a headrest mounting structure in accordance with the present invention is shown comprised of a headrest 1, a support frame 2, and two mounting bars 3.

The headrest 1 comprises a flexible cover shell 11, which has a bottom opening 111, and a stuffing material 12 stuffed in the flexible cover shell 11. The stuffing material 12 can be foamed plastics, sponge, or elastomers.

The support frame 2 is mounted inside the flexible cover shell 111 of the headrest 1, comprising an elongated horizontal mounting block 21 suspending in the bottom opening 111 of the flexible cover shell 111 of the headrest 1, and a vertical support wall 22 extending from one long side of the elongated horizontal mounting block 21 and embedded in the stuffing material 12. The elongated horizontal mounting block 21 has a bottom coupling groove 211 formed in the bottom wall and extending along the length, and a plurality of vertical mounting through holes 212 formed in the bottom coupling groove 211 and extending through the top side of the elongated horizontal mounting block 21.

The mounting bars 3 each comprise a top coupling block 31, which is coupled to the bottom coupling groove 211 of the elongated horizontal mounting block 21 of the support frame 2 and has an oblong through hole 311 cut through the top and bottom sides, and a stem 32 perpendicularly downwardly extending from one side of the top coupling block 31 and disposed outside the headrest 1.

Figure 2:
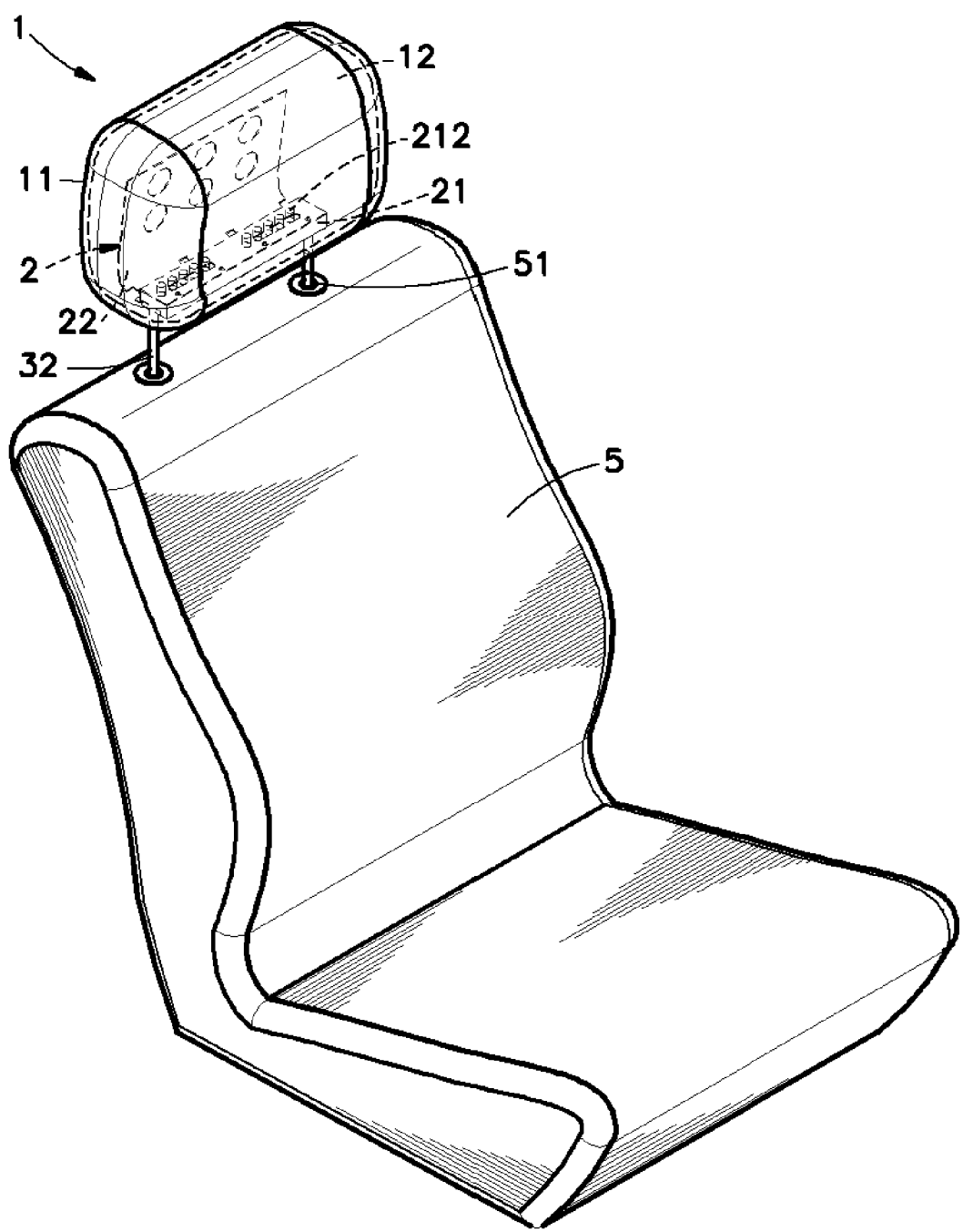
FIG. 2 is perspective view of the present invention showing the headrest mounting structure installed in a vehicle seat.

The installation process of the present invention is outlined hereinafter with reference to FIG. 2 and FIG. 1 again. The support frame 2 is mounted in the flexible cover shell 111 of the headrest 1 with the elongated horizontal mounting block 21 and the vertical support wall 22 embedded in the stuffing material 12 and the bottom coupling groove 211 facing the outside of the headrest 1 through the bottom opening 111, and then the top coupling blocks 31 of the mounting bars 3 are respectively coupled to the bottom coupling groove 211 of the elongated horizontal mounting block 21, and then fastening members, for example, screws 4 are respectively inserted through the oblong through holes 311 of the top coupling blocks 31 and selectively fastened to the vertical mounting through holes 212 to affix the mounting bars 3 to the support frame 2 subject to the pitch between two headrest mounting holes 51 on top of a vehicle seat 5. According to the present invention, the pitch between the two mounting bars 3 can be conveniently adjusted to fit different vehicle seats 5. Further, a set of mounting bars 3 that have the stems 32 made in different diameters may be prepared for selection to fit the diameter of the headrest mounting holes 51 of any of a variety of vehicle seats 5.

Therefore, the supplier can supply mounting bars 3 having the stems 32 made in different diameters so that the consumers can select the mounting bars 3 subject to the desired size to fit the diameter of the headrest mounting holes 51 of the vehicle seat 5.

Further, the mounting bars 3 can be made detachable so that the user can replace the mounting bars 3 subject to the diameter of the headrest mounting hole 51 of the vehicle seat 5.

Further, the vertical support wall 22 of the support frame 2 can be made having a smoothly arched profile to enhance the structural strength against deformation. The elongated horizontal mounting block 21 and the vertical support wall 22 may be separately made and then fastened together with fastening means. Alternatively, the vertical support wall 22 can be formed integral with the elongated horizontal mounting block 21.

Figure 3:
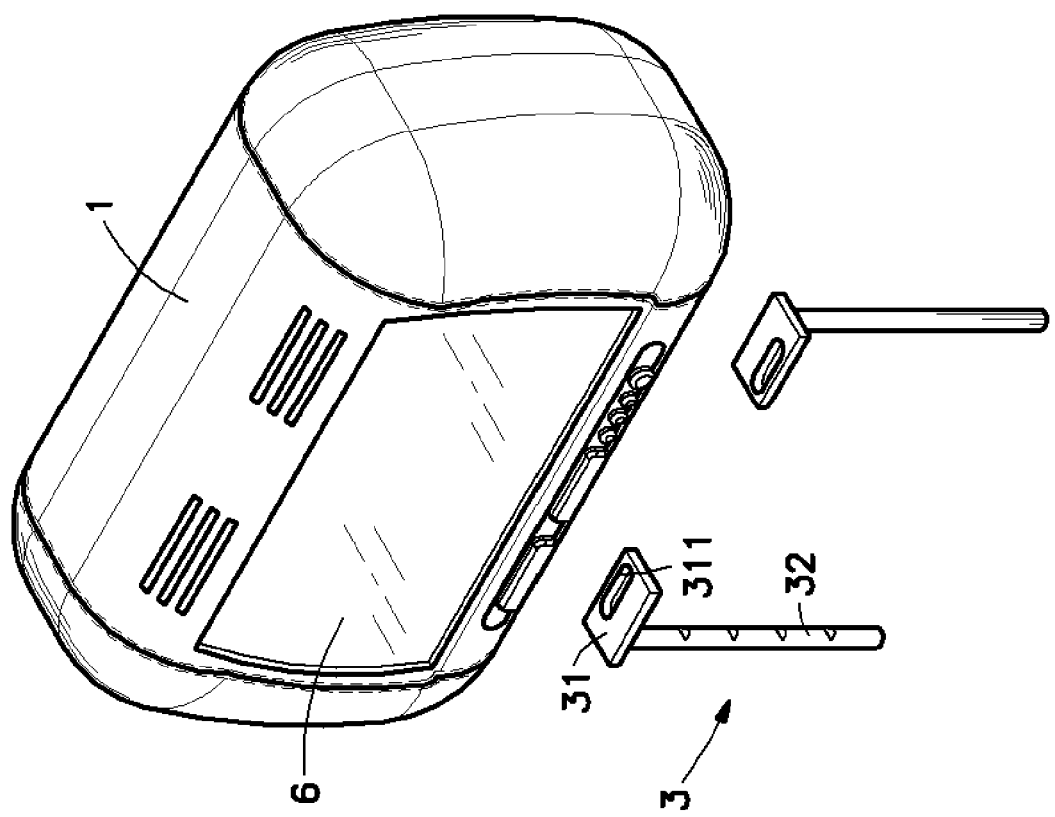
FIG. 3 is an exploded view of an alternate form of the headrest mounting structure according to the present invention.
Figure 4:
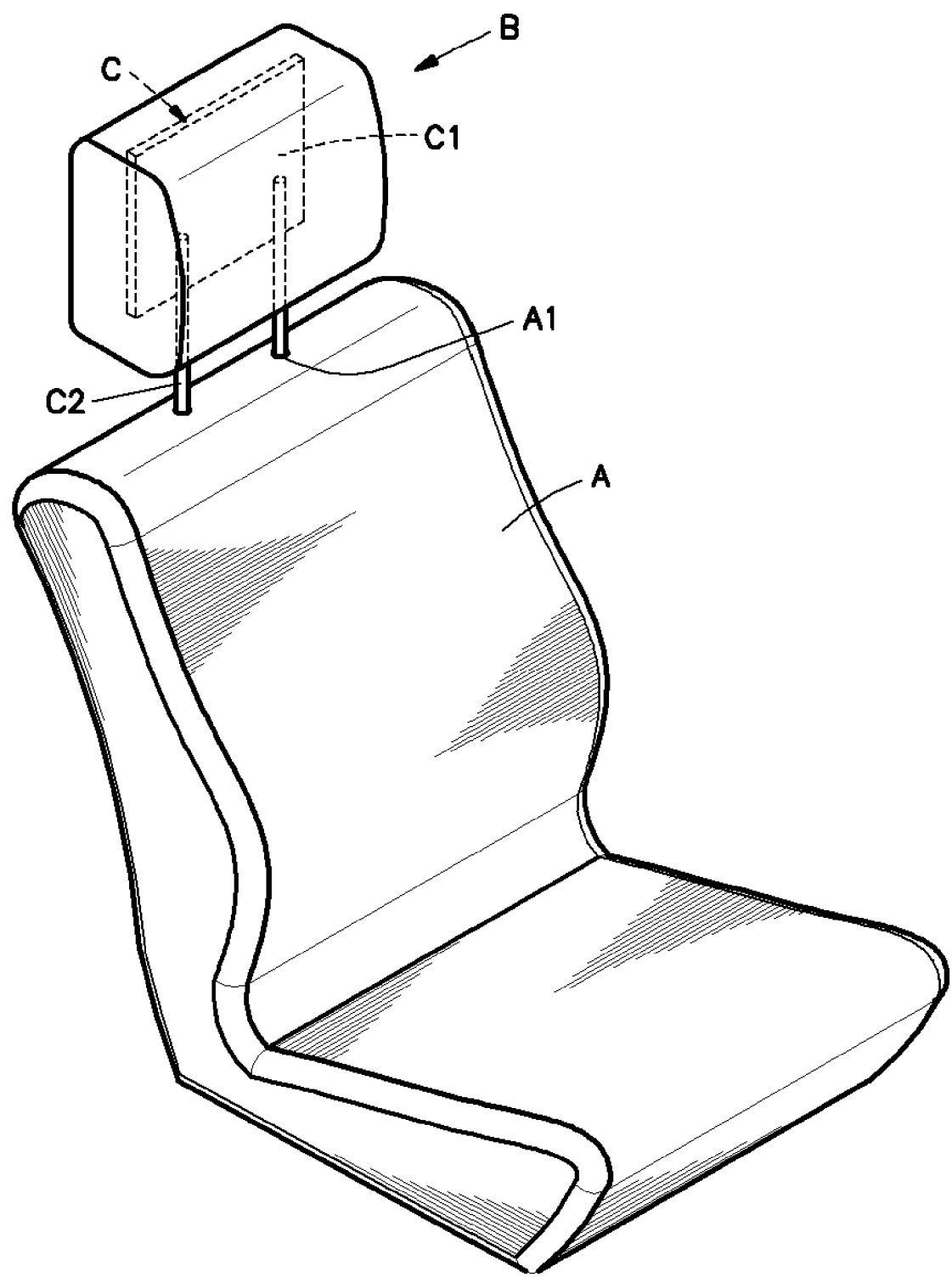
FIG. 4 is a perspective view showing a headrest mounting structure installed in a vehicle seat according to the prior art.
Figure 5:
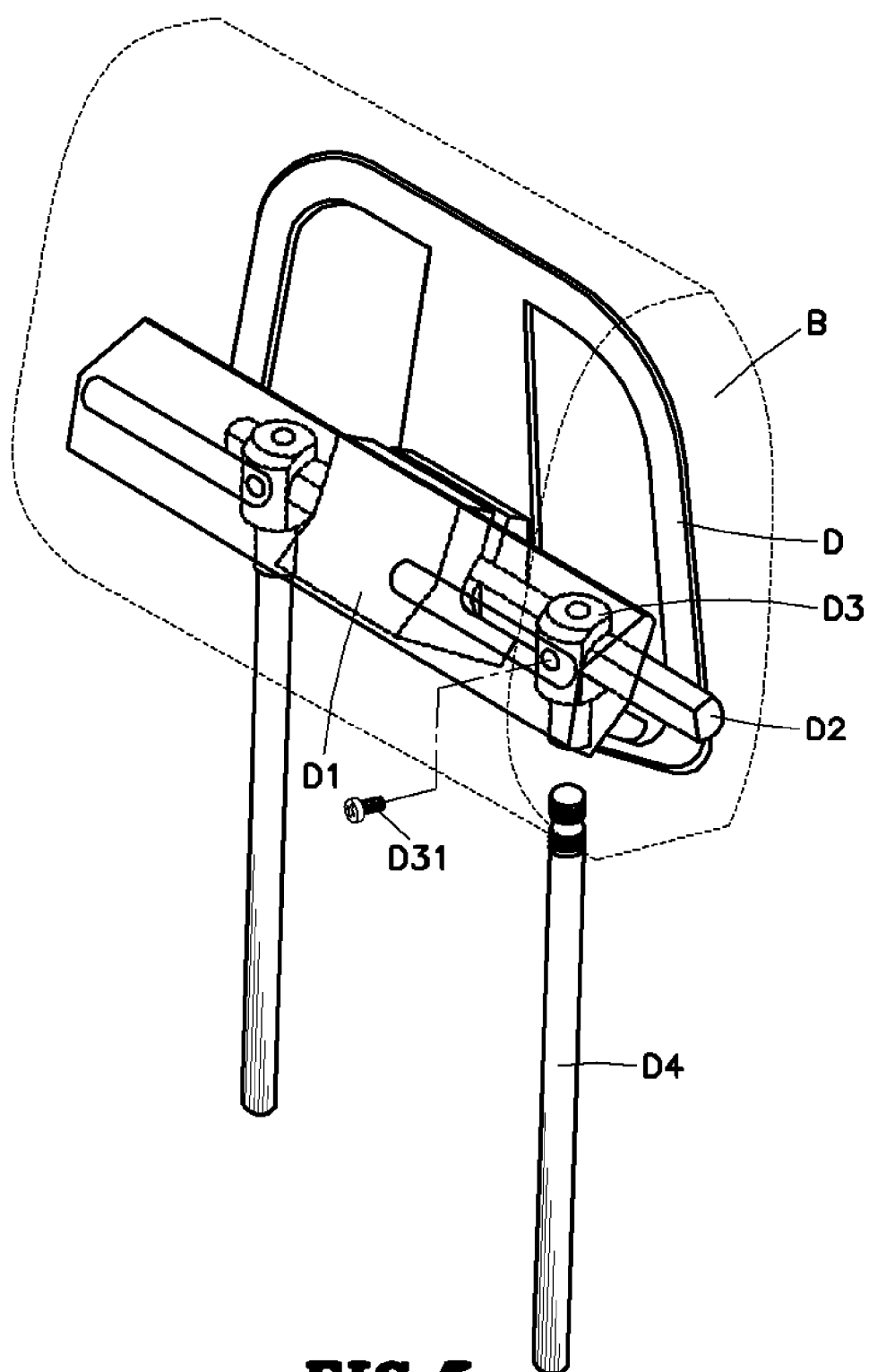
FIG. 5 is a perspective view of another structure of the headrest mounting structure according to the prior art.
Figure 6:
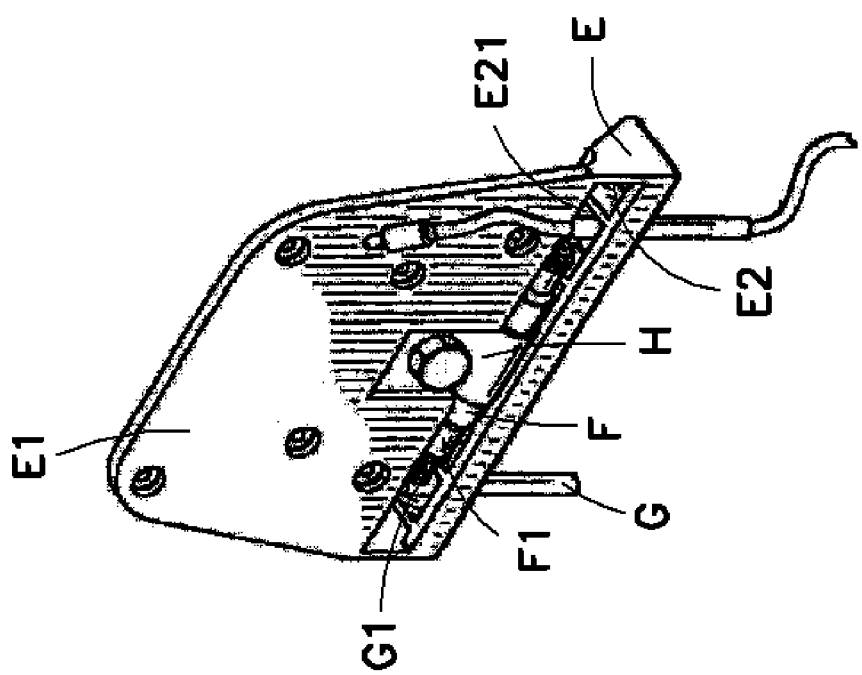
FIG. 6 is a perspective view of still another structure of the headrest mounting structure according to the prior art.
Figure 7:
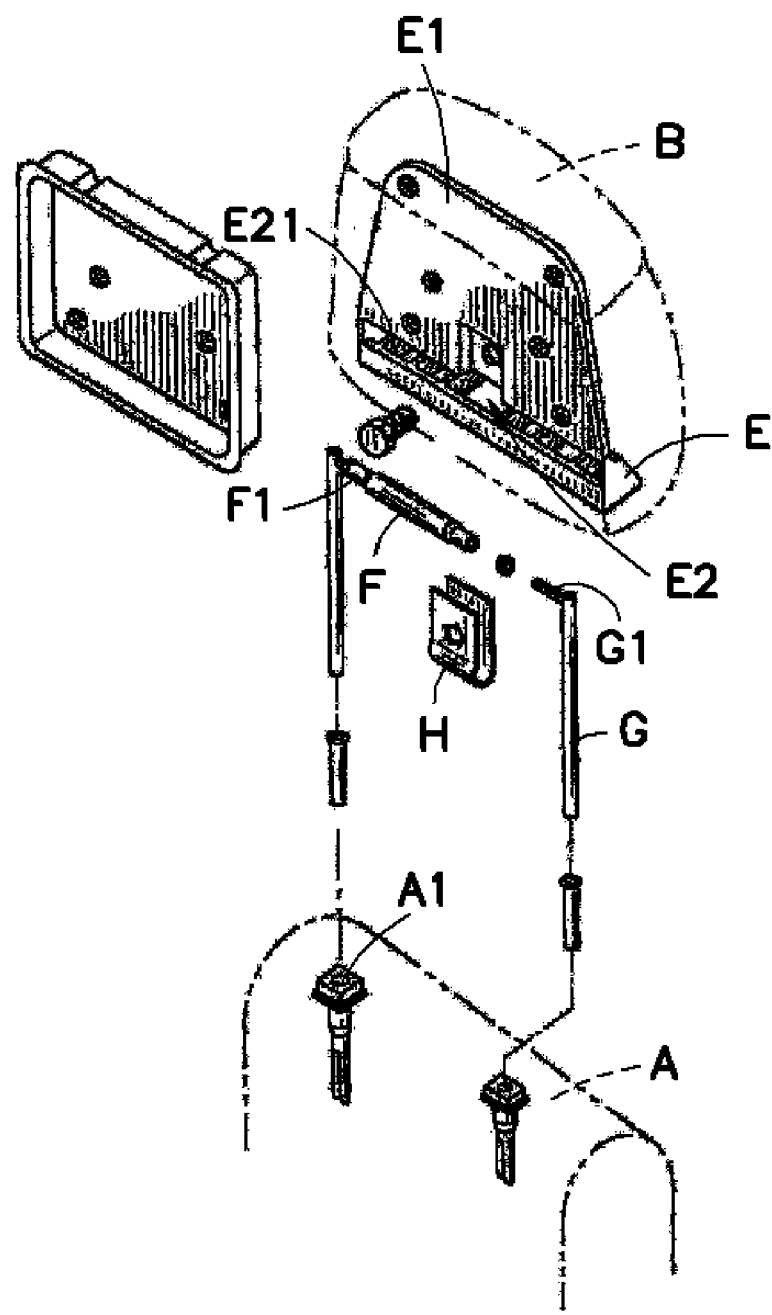
FIG. 7 is an exploded view of the headrest mounting structure shown in FIG. 6.

FIG. 3 shows an alternate form of the present invention. According to this embodiment, the headrest 1 has a LCD monitor 6 mounted on the back side of the flexible cover shell 11. By means of adjusting the pitch between the two mounting bars 3, the headrest 1 fits any of a variety of vehicle seats 5.

As indicated above, the invention provides a headrest mounting structure, which comprises a headrest 1, a support frame 2 mounted in the headrest 1 to support the headrest 1 in shape, and two mounting bars 3 that are adjustably fastened to the support frame 2 outside the headrest 1 to fit the pitch between two headrest mounting holes 51 of any of a variety of vehicle seats 5. Further, mounting bars 3 of different diameters may be provided to fit the headrest mounting holes 51 of different vehicle seats 5 of different diameters.

Although particular embodiments of the invention have been described in detail for purposes of illustration, various modifications and enhancements may be made without departing from the spirit and scope of the invention.

What is claimed is:

1. A headrest mounting structure comprising:
   a headrest, said headrest comprising a flexible cover shell, said flexible cover shell having a bottom opening, and a stuffing material stuffed in said flexible cover shell, a support frame mounted in said headrest to support said headrest in shape, said support frame comprising an elongated horizontal mounting block suspending in bottom opening of said flexible cover shell of said headrest, said elongated horizontal mounting block having a bottom coupling groove formed in a bottom wall thereof and a plurality of mounting through holes formed in said bottom coupling groove and extending through a top side of said elongated horizontal mounting block;
   a plurality of mounting bars for securing said support frame to a vehicle seat, said mounting bars each comprising a top coupling block coupled to said bottom coupling groove of said elongated horizontal mounting block of said support frame, said top coupling block having an oblong through hole cut through top and bottom sides thereof, and a stem extending perpendicularly downwardly from a bottom side of each said top coupling block for inserting into a respective headrest mounting hole on said vehicle seat; and fastening members adapted to selectively fasten said oblong through hole of said top coupling block of each of said mounting bars to said mounting through holes of said support frame.

2. The headrest mounting structure as claimed in claim 1, wherein said stuffing material is selected from the group of materials including foamed plastics, sponge and elastomers.

3. The headrest mounting structure as claimed in claim 1, wherein said support frame further comprises a vertical support wall upwardly extending from one long side of said elongated horizontal mounting block and embedded in said stuffing material.

4. The headrest mounting structure as claimed in claim 3, wherein said vertical support wall is formed integral with said elongated horizontal mounting block.

5. The headrest mounting structure as claimed in claim 3, wherein said vertical support wall has a smoothly arched profile.

6. The headrest mounting structure as claimed in claim 1, further comprising a LCD monitor mounted on back side of said flexible cover shell of said headrest.

7. The headrest mounting structure as claimed in claim 1, wherein said fastening members are screws.

8. The headrest mounting structure as claimed in claim 1, wherein said stems of said mounting bar are detachable.

* * * * *